(12) United States Patent
Griffin et al.

(10) Patent No.: US 12,395,325 B2
(45) Date of Patent: Aug. 19, 2025

(54) EAVESDROPPER IDENTIFICATION AND CONTAINER IMAGE LAYER INVALIDATION

(71) Applicant: Red Hat, Inc., Raleigh, NC (US)

(72) Inventors: Leigh Griffin, Waterford (IE); Stephen Coady, Dublin (IE)

(73) Assignee: Red Hat, Inc., Raleigh, NC (US)

( * ) Notice: Subject to any disclaimer, the term of this patent is extended or adjusted under 35 U.S.C. 154(b) by 267 days.

(21) Appl. No.: 18/327,198

(22) Filed: Jun. 1, 2023

(65) Prior Publication Data

US 2024/0405978 A1 Dec. 5, 2024

(51) Int. Cl.
*H04L 9/08* (2006.01)

(52) U.S. Cl.
CPC .................................. *H04L 9/0852* (2013.01)

(58) Field of Classification Search
CPC .................................................... H04L 9/0852
See application file for complete search history.

(56) References Cited

U.S. PATENT DOCUMENTS

| | | | |
|---|---|---|---|
| 7,646,873 B2 | 1/2010 | Lee et al. | |
| 10,855,452 B2 | 12/2020 | Fu | |
| 2022/0335139 A1* | 10/2022 | Yang | G06F 9/45558 |
| 2024/0160750 A1* | 5/2024 | Pascual | G06F 21/53 |
| 2024/0248742 A1* | 7/2024 | Frosi | G06F 9/455 |
| 2024/0427579 A1* | 12/2024 | Kussmaul | H04L 9/50 |

FOREIGN PATENT DOCUMENTS

| | | |
|---|---|---|
| DE | 102019118286 B4 | 1/2021 |
| EP | 3432509 B1 | 6/2021 |
| WO | 2021224392 A1 | 11/2021 |

OTHER PUBLICATIONS

Cao, Yuan, et al., "The Evolution of Quantum Key Distribution Networks: On the Road to the Qinternet," IEEE Communications Surveys & Tutorials, vol. 24, No. 2, pp. 839-894, doi: 10.1109/COMST.2022.3144219, second quarter 2022, 59 pages.
Dianati, Mehrdad, et al. "Transport Layer Protocols for the Secoqc Quantum Key Distribution (QKD) Network," 32nd IEEE Conference on Local Computer Networks, IEEE Computer Society, DOI 10.1109/LCN.2007.107, Oct. 2007, 8 pages.
Pedone, Ignazio, et al., "Quantum Key Distribution in Kubernetes Clusters," Future Internet 2022, 14, 160, https://doi.org/10.3390/fi14060160, May 25, 2022, 19 pages.

* cited by examiner

*Primary Examiner* — Baotran N To
(74) *Attorney, Agent, or Firm* — Dority & Manning, P.A.

(57) ABSTRACT

It is determined that a container image comprising a plurality of container image layers generated by a container build engine is to be transmitted from a container image repository to a target computing device. It is determined that a first container image layer of the plurality of container image layers is a sensitive container image layer to be encrypted prior to transmission to the target computing device. A first key generated by a quantum computing system that uses a quantum key distribution protocol, a plurality of qubits and a quantum communication channel to generate the first key is obtained. The first container image layer is encrypted using the first key to generate a first encrypted container image layer. The first encrypted container image layer is transmitted to the target computing device.

20 Claims, 4 Drawing Sheets

EAVESDROPPER IDENTIFICATION AND CONTAINER IMAGE LAYER INVALIDATION

BACKGROUND

Quantum computing involves the use of quantum bits, referred to herein as "qubits," which have characteristics that differ from those of classical (i.e., non-quantum) bits used in classical computing. For example, while a classical bit may be in a state of either one (1) or zero (0), a qubit may be in a "superposition" of both states simultaneously.

SUMMARY

The examples utilize a QKD protocol to generate a key and, while using the key to encrypt and decrypt container image layers, continually monitor the quantum communication channel used to generate the key. Upon detection of an eavesdropper, a message can be sent to any computing devices to which encrypted container image layers were transmitted so that such computing devices can stop using the container image layers.

In one example a method is provided. The method includes determining, by a computing device, that a container image comprising a plurality of container image layers generated by a container build engine is to be transmitted from a container image repository to a target computing device. The method further includes determining, by the computing device, that a first container image layer of the plurality of container image layers is a sensitive container image layer to be encrypted prior to transmission to the target computing device. The method further includes obtaining, by the computing device, a first key generated by a quantum computing system that uses a quantum key distribution protocol, a plurality of qubits and a quantum communication channel to generate the first key. The method further includes encrypting the first container image layer using the first key to generate a first encrypted container image layer. The method further includes transmitting the first encrypted container image layer to the target computing device.

In another example a computing device is provided. The computing device includes a memory, and a processor device coupled to the memory. The processor device is to determine that a container image comprising a plurality of container image layers generated by a container build engine is to be transmitted from a container image repository to a target computing device. The processor device is further to determine that a first container image layer of the plurality of container image layers is a sensitive container image layer to be encrypted prior to transmission to the target computing device. The processor device is further to obtain a first key generated by a quantum computing system that uses a quantum key distribution protocol, a plurality of qubits and a quantum communication channel to generate the first key. The processor device is further to encrypt the first container image layer using the first key to generate a first encrypted container image layer. The processor device is further to transmit the first encrypted container image layer to the target computing device.

In another example a non-transitory computer-readable storage medium is provided. The non-transitory computer-readable storage medium includes executable instructions to cause a processor device to determine that a container image comprising a plurality of container image layers generated by a container build engine is to be transmitted from a container image repository to a target computing device. The instructions further cause the processor device to determine that a first container image layer of the plurality of container image layers is a sensitive container image layer to be encrypted prior to transmission to the target computing device. The instructions further cause the processor device to obtain a first key generated by a quantum computing system that uses a quantum key distribution protocol, a plurality of qubits and a quantum communication channel to generate the first key. The instructions further cause the processor device to encrypt the first container image layer using the first key to generate a first encrypted container image layer. The instructions further cause the processor device to transmit the first encrypted container image layer to the target computing device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The phrase "container" as used herein refers to a running process that is isolated from other processes via namespaces and cgroups. A container is executed (e.g., initiated or instantiated) from a container image. A container image is a static package of software comprising one or more layers, the layers including everything needed to run an application (i.e., as a container) that corresponds to the container image, including, for example, one or more of executable runtime code, system tools, system libraries and configuration settings. A Docker® image is an example of a container image. A container image typically includes one or more file directories that include all executables, other than the host operating system kernel, necessary for the container to run. The life-cycle of a container is managed by a container runtime, sometimes referred to as a container engine, such as, by way of non-limiting example, such as runC, crun, containerd, Docker, Windows Containers, and the like.

Containers are increasingly popular in cloud computing environments due, in part, to their lightweight footprint compared to a virtual machine (VM) and the speed at which a container can be initiated compared to a VM, while still maintaining strong isolation characteristics such that two containers executing in different namespaces on the same host are not inherently aware of one another and cannot negatively impact one another.

Container images are typically stored in a container image repository and downloaded on demand by a computing device that requires the container image to initiate a container on the computing device from the container image. Information in a container image layer may be sensitive such that it is desirable that the content of the container image layer cannot be accessed by any entity other than the container runtime that will utilize the container image layer to initiate a container. To prevent an entity from accessing a container image layer, the container image layer may be encrypted for transport from the container image repository to the target computing device to ensure that no entity other than the container runtime can access the container image layer.

Certain encrypted information is particularly valuable such that, if the decryption key becomes known to a nefarious party, it may be desirable to immediately halt usage of the container image layer and even purge or delete the container image layer before the nefarious party could decrypt the container image layer. Unfortunately, in modern encryption systems, by the time an entity realizes that the encryption system has been hacked, losses have often already occurred.

Quantum key distribution (QKD) facilitates the generation of a secret key known only to a party, or parties, involved in generating the key. One such QKD protocol is the BB84 protocol. The BB84 protocol utilizes a quantum communication channel and at least two qubits. A unique property of the BB84 protocol is the ability to detect an eavesdropper eavesdropping on the quantum communication channel.

The examples utilize a QKD protocol to generate a key and, while using the key to encrypt and decrypt container image layers, continually monitor the quantum communication channel used to generate the key. Upon detection of an eavesdropper, a message can be sent to any computing devices to which encrypted container image layers were transmitted so that such computing devices can stop using the container image layers. Because an eavesdropper is detected substantially instantaneously, the computing devices safely halt usage of the container image layer and purge any encrypted information prior to the eavesdropper utilizing the key.

Figure 1:
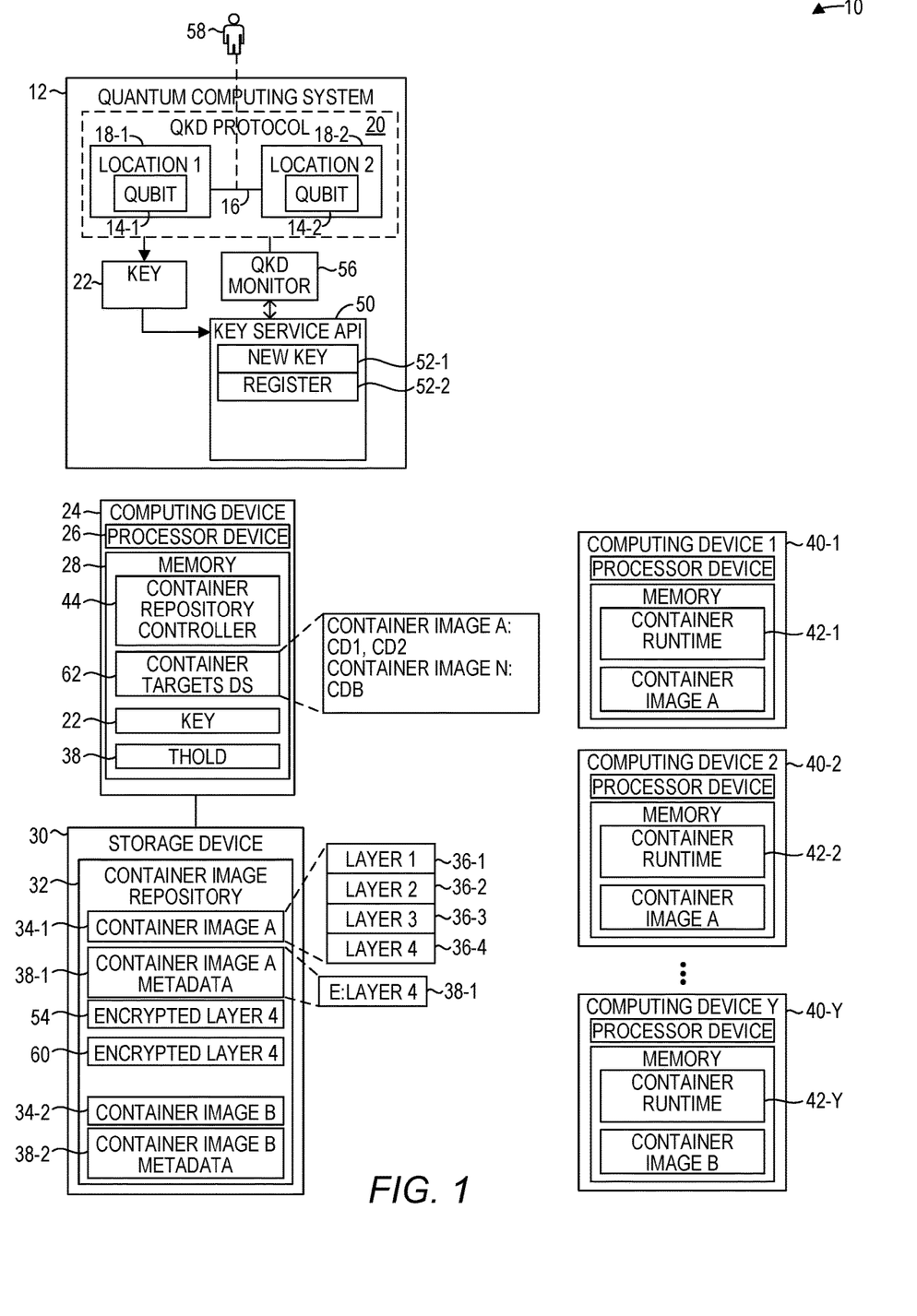
FIG. 1 is a block diagram of an environment in which instantaneous eavesdropper identification and container image layer invalidation may be practiced according to some implementations.

FIG. 1 is a block diagram of an environment 10 in which instantaneous eavesdropper identification and container image layer invalidation may be practiced according to some embodiments. The environment 10 includes a quantum computing system 12. The quantum computing system 12 includes a qubit 14-1, a qubit 14-2, and a quantum communication channel 16. The qubit 14-1 may be at a location 18-1, and the qubit 14-2 may be at a location 18-2. The locations 18-1 and 18-2 may be geographically distant from one another or geographically close to one another. The quantum computing system 12 utilizes a quantum key distribution (QKD) protocol 20, such as, by way of non-limiting example, a BB84 QKD protocol, in conjunction with the qubits 14-1, 14-2 and the quantum communication channel 16 to generate a key upon request.

The environment 10 includes a computing device 24 that in turn includes a processor device 26 and a memory 28. The computing device 24 includes, or is communicatively coupled to, a storage device 30. The storage device 30 stores a container image repository 32 that includes a plurality of container images 34-1-34-2 (generally, container images 34). While only two container images 34 are illustrated, in practice the container image repository 32 may include hundreds or thousands of container images 34. In some implementations, the storage device 30 may be accessible by only the computing device 24 such that no other computing device can access any of the container images 34.

Each of the container images 34 comprise a plurality of container image layers. The container image layers are generated by a container build engine, such as, by way of non-limiting example, the Docker container build engine. In this example the container image 34-1 comprises four container image layers 36-1-36-4. The container image repository 32 may also store, for each container image 34-1-34-2, corresponding container image metadata 38-1-38-2, each of which contains information that indicates which container image layers of the corresponding container image 34-1-34-2 are sensitive container image layers that are to be encrypted prior to transmission. In this example, the container image metadata 38-1 indicates that the container image layer 36-4 is a sensitive container image layer that is to be encrypted prior to transmission. Container image layers 36-1-36-3 are not sensitive container image layers and thus need not be encrypted prior to transmission.

The environment 10 also includes a plurality of target computing devices 40-1-40-Y, each of which includes a corresponding container runtime 42-1-42-Y which is operable to, upon instruction, initiate a container from a container image 34. Each of the container runtimes 42-1-42-Y are configured to request a container image 34 from a container repository controller 44 that executes in the memory 28 of the computing device 24. The term "target" in the phrase "target computing device" is simply to distinguish the computing devices 40 from other computing devices described herein and does not imply any particular characteristics or attributes other than those explicitly discussed herein.

The quantum computing system 12 includes a processor device and a memory. The quantum computing system 12 includes an application programming interface (API) 50 that offers a number of functions 52-1-52-2 that can be invoked by the computing device 24 to obtain certain services from the quantum computing system 12. In one implementation, the computing device 24 may invoke a new-key function 52-1 to cause the quantum computing system 12 to generate a key and return the generated key to the computing device 24 for use in encrypting one or more container image layers prior to transmission to a target computing device 40.

With this background an example of instantaneous eavesdropper identification and container image layer invalidation will be discussed. In this example, the computing device 40-1 is instructed to initiate a container from the container image 34-1. In some implementations the computing devices 40-1-40-Y may be worker nodes in a cluster that is managed by a container orchestration system, such as, by way of non-limiting example, OpenShift or Kubernetes. An orchestration controller of the container orchestration system may instruct the computing device 40-1 to initiate a container from the container image 34-1.

The computing device 40-1 is configured to request the container image 34-1 from the container repository controller 44, and thus the container runtime 42-1 sends a request to the container repository controller 44 for the container image 34-1. The container repository controller 44 accesses the container image metadata 38-1 and determines that the container image layers 36-1-36-3 can be transmitted to the computing device 40-1 without encrypting the container image layers 36-1-36-3. The container repository controller 44 determines that the container image layer 36-4 is a sensitive container image layer and is to be encrypted prior to transmission to the target computing device 40-1.

The container repository controller 44 may transmit the container image layers 36-1-36-3 to the target computing device 40-1. The container repository controller 44 invokes the new key function 52-1 to request an encryption key from the quantum computing system 12. The quantum computing system 12 generates a key 22 using the QKD protocol 20, the qubits 18-1, 18-2 and the quantum communication channel 16. The quantum computing system 12 returns the key 22 to the container repository controller 44. The container repository controller 44 utilizes the key 22 to encrypt the container image layer 36-4 to generate an encrypted container image layer 54, and transmits the encrypted container image layer 54 to the target computing device 40-1. The container repository controller 44 may transmit information to the target computing device 40-1 indicating that the encrypted container image layer 54 is encrypted. In some implementations, the key 22 may be a symmetric key that is used to both encrypt and decrypt the encrypted container image layer 54. The container repository controller 44 may transmit the key 22 to the target computing device 40-1. In other implementations, upon determining that the encrypted container image layer 54 is encrypted, the target computing device 40-1 may request the key 22 from the quantum computing system 12.

The quantum computing system 12 includes a QKD monitor 56, which continuously monitors the quantum communication channel 16 for eavesdroppers. Upon detection of an eavesdropper, the quantum computing system 12 may notify any entity that has registered for notifications of the eavesdropper.

In one implementation, the computing device 24 registers for notifications of eavesdroppers by invoking a register function 52-2 of the API 50. For purposes of illustration, assume that the quantum computing system 12 detects an eavesdropper 58. The quantum computing system 12 may also determine an estimated amount of the key 22 that has been ascertained by the eavesdropper 58 via the use of a test statistic. The quantum computing system 12 determines that the computing device 24 has registered for notification of an eavesdropper. The quantum computing system 12 sends the computing device 24 a message that indicates the eavesdropper 58 has been detected. The message may also include the estimated amount of the key 22 that has been ascertained by the eavesdropper 58.

In response to determining that the eavesdropper 58 has eavesdropped on the quantum communication channel 16, the computing device 24 may send a message to the target computing device 40-1 indicating that the encrypted container image layer 54 has been compromised. The computing device 24 may automatically Invoke the new key function 52-1 to obtain a second key generated by the quantum computing system 12 using the quantum key distribution protocol 20, the plurality of qubits 14-1, 14-2 and the quantum communication channel 16. The quantum computing system 12 generates a new key and sends the new key to the computing device 24. The computing device 24 encrypts the container image layer 36-4 using the second key to generate a second encrypted container image layer 60 and transmits the second encrypted container image layer 60 to the target computing device 40-1. The container repository controller 44 deletes the encrypted container image layer 54.

The container repository controller 44 may receive a request for the container image 34-1 from any number of target computing devices 40. In this example, the container repository controller 44 received a request for the container image 34-1 from the target computing devices 40-1 and 40-2. Each time a target computing device 40 requests the container image 34-1, the container repository controller 44 stores, in a container targets data structure 62 information that identifies that the respective target computing device 40 requested the container image 34. Upon determining that the eavesdropper 58 eavesdropped on the quantum communication channel 16, the container repository controller 44 accesses the container targets data structure 62 and determines each target computing device 40 to which the particular container image 34-1 was transmitted. The container repository controller 44 sends, to each target computing device 40 to which the particular container image 34-1 was transmitted, a message that the encrypted container image layer 36-4 has been compromised.

In some implementations, the container repository controller 44 determines an estimated amount of the key 22 that was ascertained by the eavesdropper 58. In one implementation, the container repository controller 44 may include the estimated amount of the key 22 that was ascertained by the eavesdropper 58 with the message to the container repository controller 44 that the eavesdropper 58 has been detected. The container repository controller 44 may compare the estimated amount to a threshold 64 and determine that the estimated amount of the key ascertained by the eavesdropper 58 is less than the threshold 64. In response to determining that the estimated amount of the key 22 ascertained by the eavesdropper 58 is less than the threshold 64, the container repository controller 44 may inhibit sending a message to the target computing device 40-1 indicating that the encrypted container image layer 36-4 has been compromised. If the container repository controller 44 determines that the estimated amount of the key ascertained by the eavesdropper 58 is equal to or greater than the threshold 64, the container repository controller 44 may send the message to the target computing device 40-1 indicating that the encrypted container image layer 36-4 has been compromised.

It is noted that, because the container repository controller 44 is a component of the computing device 24, functionality implemented by the container repository controller 44 may be attributed to the computing device 24 generally. Moreover, in examples where the container repository controller 44 comprises software instructions that program the processor device 26 to carry out functionality discussed herein, functionality implemented by the container repository controller 44 may be attributed herein to the processor device 26.

Moreover, in some implementations the container repository controller 44 may execute on the quantum computing system 12 and the functionality described herein with respect to the computing device 24 is integrated into the quantum computing system 12.

Figure 2:
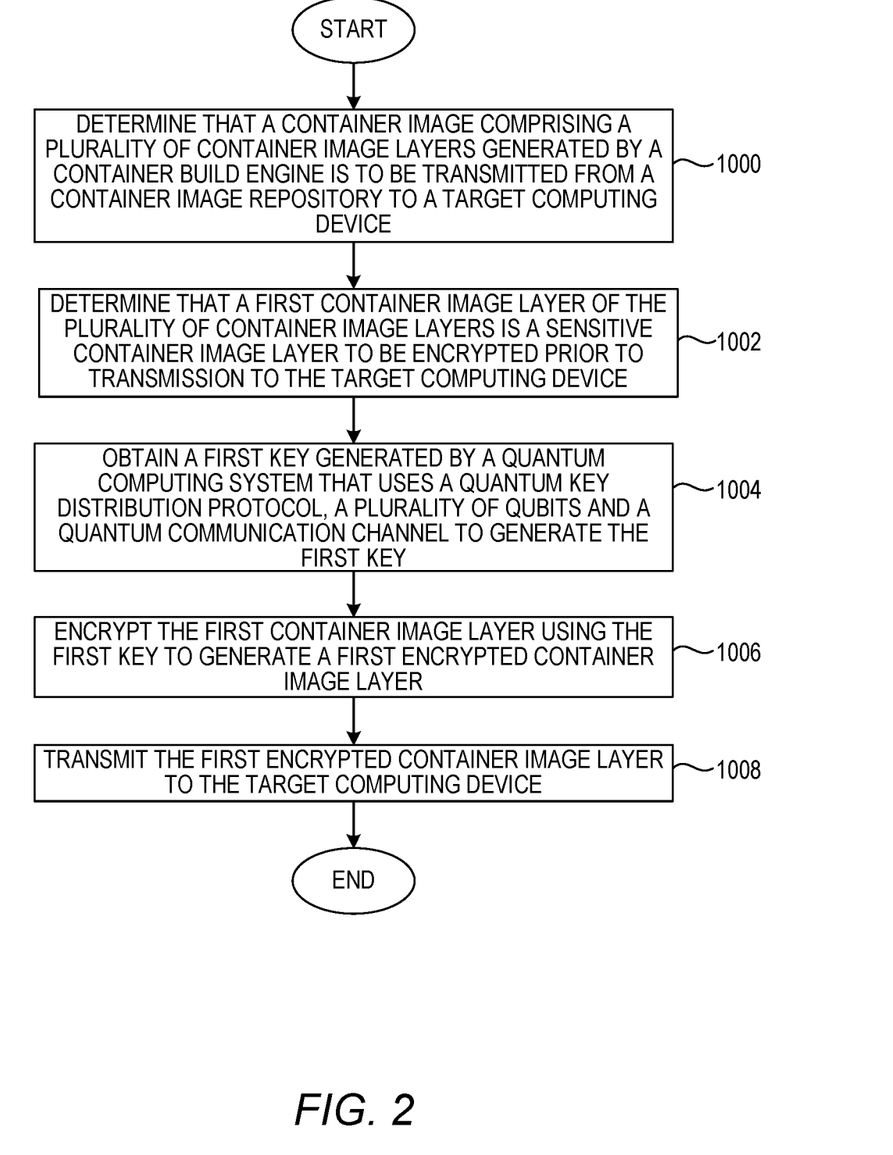
FIG. 2 is a flowchart of a method for instantaneous eavesdropper identification and container image layer invalidation according to some implementations.

FIG. 2 is a flowchart of a method for instantaneous eavesdropper identification and container image layer invalidation according to some implementations. FIG. 2 will be discussed in conjunction with FIG. 1. The computing device 24 determines that the container image 38-1 comprising the plurality of container image layers 36-1-36-4 generated by a container build engine is to be transmitted from the container image repository 32 to the target computing device 40-1 (FIG. 2, block 1000). The computing device 24 determines that the container image layer 36-4 of the plurality of container image layers 36-1-36-4 is a sensitive container image layer to be encrypted prior to transmission to the target computing device 40-1 (FIG. 2, block 1002). The computing device 24 obtains the key 22 generated by the quantum computing system 12 that uses the quantum key distribution protocol 20, the plurality of qubits 14-1-14-2, and the quantum communication channel 16 to generate the key 22 (FIG. 2, block 1004). The computing device 24 encrypts the container image layer 36-4 using the key 22 to generate the encrypted container image layer 54 (FIG. 2, block 1006). The computing device 24 transmits the encrypted container image layer 54 to the target computing device 40-1 (FIG. 2, block 1008).

Figure 3:
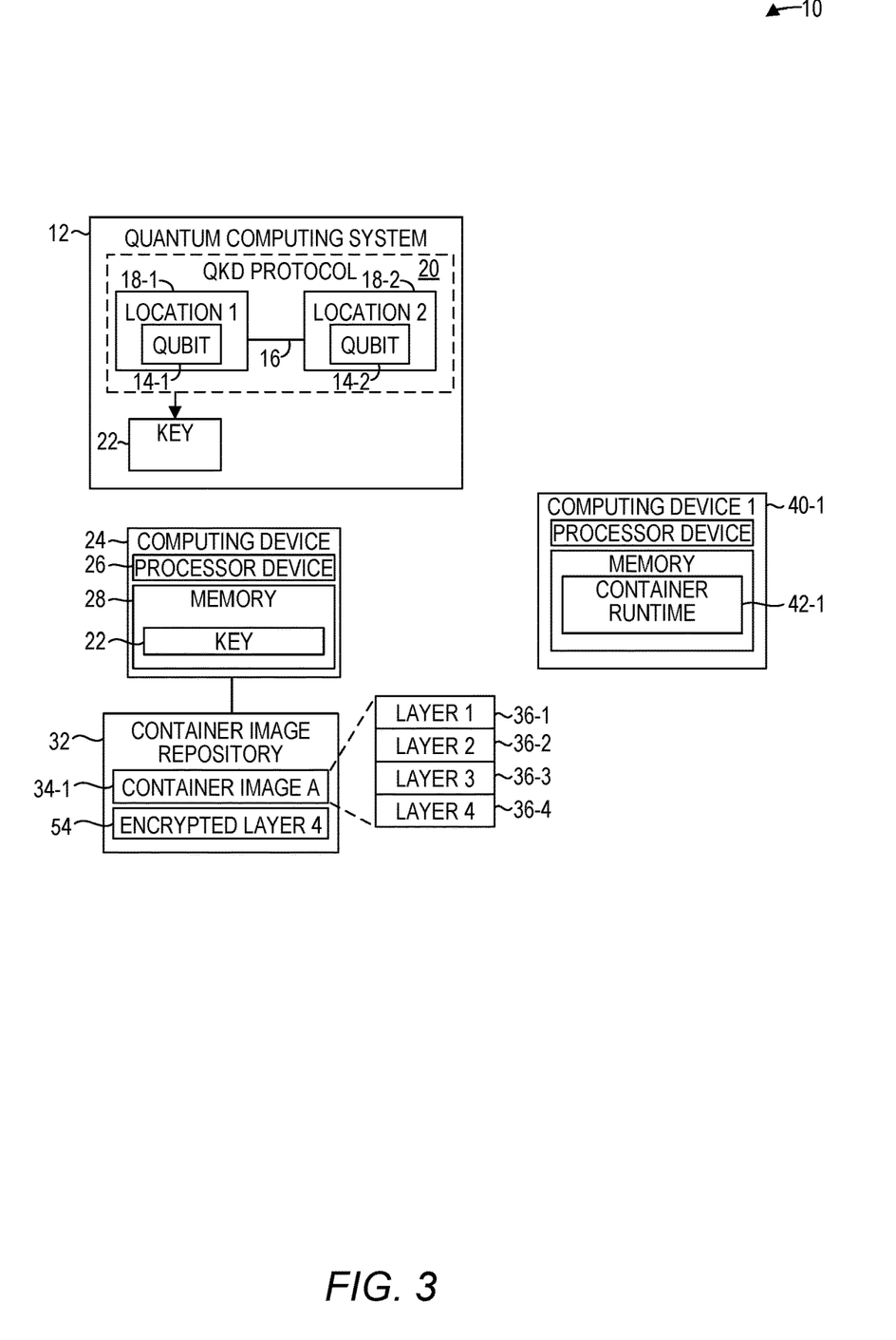
FIG. 3 is a simplified block diagram of the environment illustrated in FIG. 1 according to another implementation.

FIG. 3 is a simplified block diagram of the environment 10 illustrated in FIG. 1 according to another implementation. The environment 10 includes the computing device 24, which in turn includes the memory 28 and the processor device 26 coupled to the memory 28. The processor device 26 is to determine that the container image 38-1 comprising the plurality of container image layers 36-1-36-4 generated by a container build engine is to be transmitted from the container image repository 32 to the target computing device 40-1. The processor device 26 is further to determine that the container image layer 36-4 of the plurality of container image layers 36-1-36-4 is a sensitive container image layer to be encrypted prior to transmission to the target computing device 40-1. The processor device 26 is further to obtain the key 22 generated by the quantum computing system 12 that uses the quantum key distribution protocol 20, the plurality of qubits 14-1-14-2, and the quantum communication channel 16 to generate the key 22. The processor device 26 is further to encrypt the container image layer 36-4 using the key 22 to generate the encrypted container image layer 54. The processor device 26 is further to transmit the encrypted container image layer 54 to the target computing device 40-1.

Figure 4:
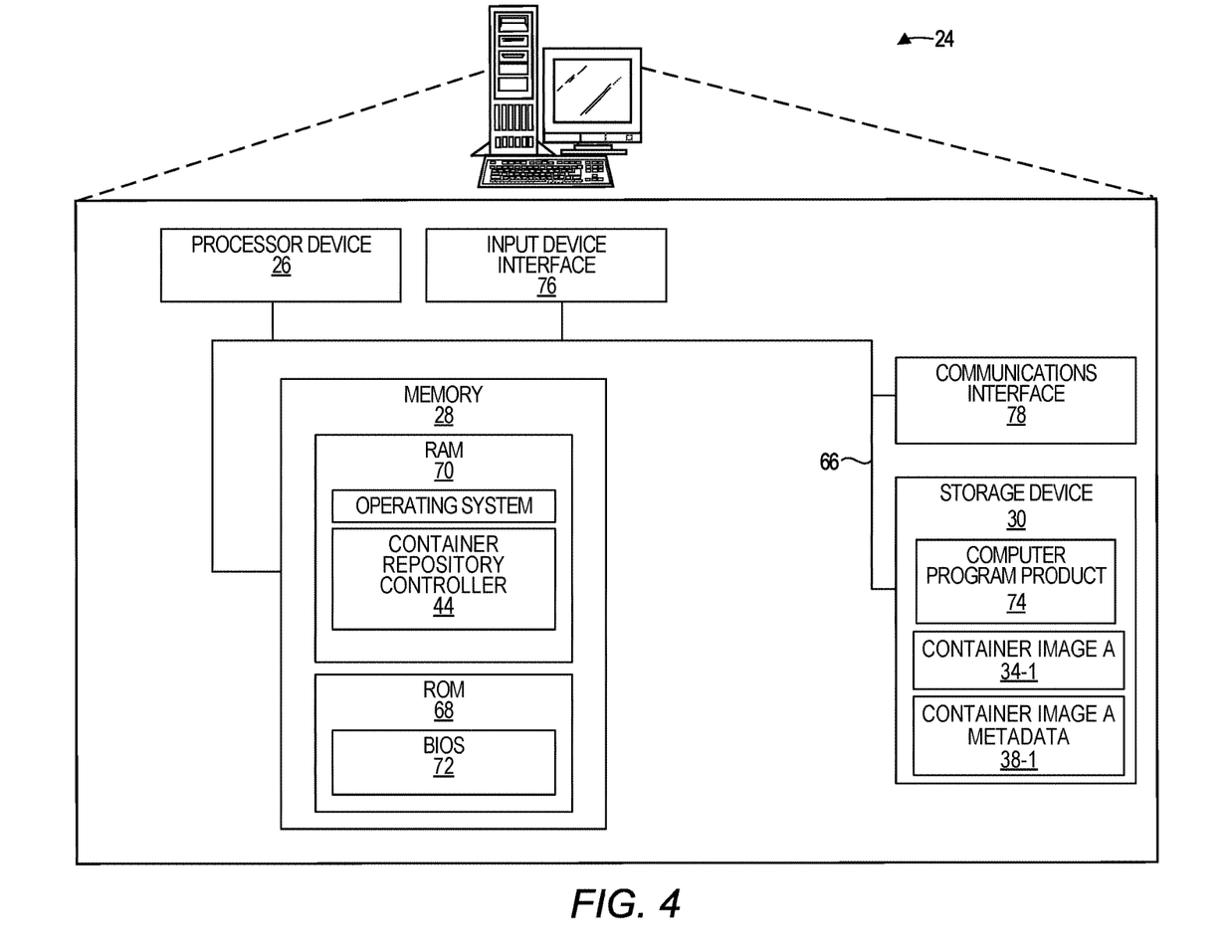
FIG. 4 is a block diagram of a computing device illustrated in FIG. 1 according to another implementation.

FIG. 4 is a block diagram of the computing device 24 suitable for implementing examples according to one example. The computing device 24 may comprise any computing or electronic device capable of including firmware, hardware, and/or executing software instructions to implement the functionality described herein, such as a computer server or the like. The computing device 24 includes the processor device 26, the memory 28, and a system bus 66. The system bus 66 provides an interface for system components including, but not limited to, the memory 28 and the processor device 26. The processor device 26 can be any commercially available or proprietary processor.

The system bus 66 may be any of several types of bus structures that may further interconnect to a memory bus (with or without a memory controller), a peripheral bus, and/or a local bus using any of a variety of commercially available bus architectures. The memory 28 may include non-volatile memory 68 (e.g., read-only memory (ROM), erasable programmable read-only memory (EPROM), electrically erasable programmable read-only memory (EEPROM), etc.), and volatile memory 70 (e.g., random-access memory (RAM)). A basic input/output system (BIOS) 72 may be stored in the non-volatile memory 68 and can include the basic routines that help to transfer information between elements within the computing device 24. The volatile memory 70 may also include a high-speed RAM, such as static RAM, for caching data.

The computing device 24 may further include or be coupled to a non-transitory computer-readable storage medium such as the storage device 30, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 30 and other drives associated with computer-readable media and computer-usable media may provide non-volatile storage of data, data structures, computer-executable instructions, and the like. A number of modules can be stored in the storage device 30 and in the volatile memory 70, including an operating system and one or more program modules, such as the container repository controller 44, which may implement the functionality described herein in whole or in part. All or a portion of the examples may be implemented as a computer program product 74 stored on a transitory or non-transitory computer-usable or computer-readable storage medium, such as the storage device 30, which includes complex programming instructions, such as complex computer-readable program code, to cause the processor device 26 to carry out the steps described herein. Thus, the computer-readable program code can comprise software instructions for implementing the functionality of the examples described herein when executed on the processor device 26. The processor device 26, in conjunction with the container repository controller 44 in the volatile memory 70, may serve as a controller, or control system, for the computing device 24 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 26 through an input device interface 76 that is coupled to the system bus 66 but can be connected by other interfaces such as a parallel port, an Institute of Electrical and Electronic Engineers (IEEE) 1394 serial port, a Universal Serial Bus (USB) port, an IR interface, and the like. The computing device 24 may also include a communications interface 78 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:

determining, by a computing device, that a container image comprising a plurality of container image layers generated by a container build engine is to be transmitted from a container image repository to a target computing device;

determining, by the computing device, that a first container image layer of the plurality of container image layers is a sensitive container image layer to be encrypted prior to transmission to the target computing device;

obtaining, by the computing device, a first key generated by a quantum computing system that uses a quantum key distribution protocol, a plurality of qubits and a quantum communication channel to generate the first key;

encrypting the first container image layer using the first key to generate a first encrypted container image layer; and transmitting the first encrypted container image layer to the target computing device.

2. The method of claim 1 wherein determining that the first container image layer of the plurality of container image layers is a sensitive container image layer to be encrypted prior to transmission to the target computing device comprises accessing metadata that indicates which container image layers of the plurality of container image layers are sensitive container image layers.

3. The method of claim 1 further comprising:

determining, by the computing device, that a plurality of container image layers including the first container image layer are sensitive container image layers to be encrypted prior to transmission to the target computing device;

encrypting, by the computing device, the plurality of container image layers using the first key to generate a corresponding plurality of encrypted container image layers; and transmitting the plurality of encrypted container image layers to the target computing device.

4. The method of claim 1 further comprising:

determining, by the computing device, that a second container image layer of the plurality of container image layers is not a sensitive container image layer; and sending, by the computing device to the target computing device, the second container image layer without encrypting the second container image layer.

5. The method of claim 1 further comprising:

determining, by the computing device, that an eavesdropper has eavesdropped on the quantum communication channel;

in response to determining that the eavesdropper has eavesdropped on the quantum communication channel, sending a message to the target computing device indicating that the first encrypted container image layer has been compromised.

6. The method of claim 5 further comprising:

in response to determining that the eavesdropper has eavesdropped on the quantum communication channel, automatically obtaining, by the computing device, a second key generated by the quantum computing system using the quantum key distribution protocol, the plurality of qubits and the quantum communication channel;

encrypting the first container image layer using the second key to generate a second encrypted container image layer; and transmitting the second encrypted container image layer to the target computing device.

7. The method of claim 5 further comprising:

determining, by the computing device, an estimated amount of the first key ascertained by the eavesdropper; and determining, by the computing device, that the estimated amount of the first key ascertained by the eavesdropper is less than a threshold;

in response to determining, by the computing device, that the estimated amount of the first key ascertained by the eavesdropper is less than the threshold, inhibiting sending a message to the target computing device indicating that the first encrypted container image layer has been compromised.

8. The method of claim 5 further comprising:

determining, by the computing device, an estimated amount of the first key ascertained by the eavesdropper; and determining, by the computing device, that the estimated amount of the first key ascertained by the eavesdropper is greater than a threshold;

in response to determining, by the computing device, that the estimated amount of the first key ascertained by the eavesdropper is greater than the threshold, sending a message to the target computing device indicating that the first encrypted container image layer has been compromised.

9. The method of claim 1 wherein the quantum computing system comprises the computing device.

10. The method of claim 1 further comprising:

determining, by the computing device, that an eavesdropper has eavesdropped on the quantum communication channel;

in response to determining that the eavesdropper has eavesdropped on the quantum communication channel, determining a plurality of target computing devices to which the first encrypted container image layer has been transmitted; and sending, by the computing device to each of the plurality of target computing devices, a message that the first encrypted container image layer has been compromised.

11. The method of claim 10 further comprising:

automatically obtaining, by the computing device, a second key generated by the quantum computing system using the quantum key distribution protocol, the plurality of qubits and the quantum communication channel;

encrypting the first container image layer using the second key to generate a second encrypted container image layer; and transmitting, by the computing device to each of the plurality of target computing devices, the second encrypted container image layer.

12. A computing device comprising:

a memory; and a processor device coupled to the memory to:

determine that a container image comprising a plurality of container image layers generated by a container build engine is to be transmitted from a container image repository to a target computing device;

determine that a first container image layer of the plurality of container image layers is a sensitive container image layer to be encrypted prior to transmission to the target computing device;

obtain a first key generated by a quantum computing system that uses a quantum key distribution protocol, a plurality of qubits and a quantum communication channel to generate the first key;

encrypt the first container image layer using the first key to generate a first encrypted container image layer; and transmit the first encrypted container image layer to the target computing device.

13. The computing device of claim 12 wherein to determine that the first container image layer of the plurality of container image layers is a sensitive container image layer to be encrypted prior to transmission to the target computing device, the processor device is further to access container image metadata that indicates which container image layers of the plurality of container image layers are sensitive container image layers.

14. The computing device of claim 12 wherein the processor device is further to:

determine that a plurality of container image layers including the first container image layer are sensitive container image layers to be encrypted prior to transmission to the target computing device;

encrypt the plurality of container image layers using the first key to generate a corresponding plurality of encrypted container image layers; and transmit the plurality of encrypted container image layers to the target computing device.

15. The computing device of claim 12 wherein the processor device is further to:

determine that a second container image layer of the plurality of container image layers is not a sensitive container image layer; and send, to the target computing device, the second container image layer without encrypting the second container image layer.

16. The computing device of claim 12 wherein the processor device is further to:

determine that an eavesdropper has eavesdropped on the quantum communication channel;

in response to determining that the eavesdropper has eavesdropped on the quantum communication channel, send a message to the target computing device indicating that the first encrypted container image layer has been compromised.

17. A non-transitory computer-readable storage medium that includes executable instructions to cause a processor device to:

determine that a container image comprising a plurality of container image layers generated by a container build engine is to be transmitted from a container image repository to a target computing device;

determine that a first container image layer of the plurality of container image layers is a sensitive container image layer to be encrypted prior to transmission to the target computing device;

obtain a first key generated by a quantum computing system that uses a quantum key distribution protocol, a plurality of qubits and a quantum communication channel to generate the first key;

encrypt the first container image layer using the first key to generate a first encrypted container image layer; and transmit the first encrypted container image layer to the target computing device.

18. The non-transitory computer-readable storage medium of claim 17 wherein to determine that the first container image layer of the plurality of container image layers is a sensitive container image layer to be encrypted prior to transmission to the target computing device, the instructions are further operable to cause the processor device to access container image metadata that indicates which container image layers of the plurality of container image layers are sensitive container image layers.

19. The non-transitory computer-readable storage medium of claim 17 wherein the instructions are further operable to cause the processor device to:

determine that a plurality of container image layers including the first container image layer are sensitive container image layers to be encrypted prior to transmission to the target computing device;

encrypt the plurality of container image layers using the first key to generate a corresponding plurality of encrypted container image layers; and transmit the plurality of encrypted container image layers to the target computing device.

20. The non-transitory computer-readable storage medium of claim 17 wherein the instructions are further operable to cause the processor device to:

determine that a second container image layer of the plurality of container image layers is not a sensitive container image layer; and send, to the target computing device, the second container image layer without encrypting the second container image layer.

* * * * *